United States Patent [19]
Perchak

[11] Patent Number: 5,818,633
[45] Date of Patent: Oct. 6, 1998

[54] LASER LEVELING TARGET WITH FRESNEL LENS SYSTEM

[75] Inventor: Robert M. Perchak, Dayton, Ohio

[73] Assignee: Mirage Development, Ltd., Dayton, Ohio

[21] Appl. No.: 639,900

[22] Filed: Apr. 29, 1996

[51] Int. Cl.$^6$ .............................. G02B 27/44; G02B 3/08; G01B 11/14
[52] U.S. Cl. ......................... 359/565; 359/742; 356/399
[58] Field of Search ..................... 359/565, 569, 359/742; 356/399, 400; 362/259; 33/293

[56] References Cited

U.S. PATENT DOCUMENTS

| | | | |
|---|---|---|---|
| 5,095,629 | 3/1992 | Klemer et al. | 33/293 |
| 5,570,189 | 10/1996 | Salmon | 356/399 |
| 5,710,647 | 1/1998 | Perchak | 359/15 |

*Primary Examiner*—Jon W. Henry
*Assistant Examiner*—Andrey Chang
*Attorney, Agent, or Firm*—Joseph G. Nauman

[57] ABSTRACT

Targets for use with scanning light beam leveling/marking devices, are constructed with their elements assembled as unitary target structure. The lens and beam divider functions are provided by optical quality fresnel lenses attached to or formed on a polycarbonate block, these parts thus can be made essentially an integral element. These special fresnel lens which are optically equivalent of the input lens and beam dividing axicon, and the viewing screen diffuser function provided by a frosted viewing plate. A separate fresnel lens is mounted alongside the beam dividing lenses and functions to provide a reference image on the viewing screen. The optical path for the impinging light beam (after it is divided) may be transmitted directly through the body block, from the input to the view window, or through a reflector surface at a side of the block, the block body of the target functioning as a waveguide.

10 Claims, 3 Drawing Sheets

LASER LEVELING TARGET WITH FRESNEL LENS SYSTEM

RELATED APPLICATION

This application is related to U.S. patent application Ser. No. 08/520,853 filed 30 Aug. 1995 by the same inventor.

FIELD OF THE INVENTION

This invention relates to target devices for viewing of a scanning light beam, preferably a laser beam, in systems used to develop an accurate level or elevation position.

BACKGROUND OF THE INVENTION

As explained in the parent application, many techniques exist for viewing or detecting scanning laser beams at a distance, as in laser beam leveling systems. A typical system is disclosed in U.S. Pat. No. 4,221,483 issued 9 Sep. 1980. These scanning and leveling devices are often portable instruments, and produce a collimated beam of laser light which is directed on a horizontal axis and rotated (scanned) in a circle, to produce a trace for making one or more reference level marks along boundaries, for example, about an area, along a wall, etc. The instrument is leveled at its location so the laser beam scans in a truly horizontal plane. Usually the laser is a HeNe or laserdiode operating around 633nm. These are used because of cost and availability. A yellow-green laser is sometimes used as these are more suitable to the sensitivity of the human eye.

Various targets are used to assist in referencing the point or points at which the beam impinges the object (e.g. surface) to be marked. Some of the target techniques are: a) a diffuse reflective scatterer over a broad area, such as a white card, on which views are relatively dim because energy is spread out; b) ground glass or back side aluminized ground glass, which are brighter and less diffuse than white card; c) corner cube reflectors, such as in taillight reflectors for automobiles, which have very bright and very narrow angle of view; d) retroreflective film, similar to the corner cube reflectors; and e) a target, as disclosed in U.S. Pat. No. 5,095,629, which is a molded plastic target with a side for transmission and one side for reflection. This last mentioned form of target device incorporates a fresnel lens and/or group of miniprism facets which serve to direct the light off-axis; by adding a specially designed surface texture to the other side of the target, a particular shape of diffuse pattern can be generated.

The target material can additionally be molded with a dye which functions to filter and effectively exclude all wavelengths except a moderately narrow band around the wavelength of the laser to be viewed. The aforementioned targets are typically used with a rotating laser beam of less than 2 milliwatts and at a rotational speed of less than 600 rev./min. This power and scanning speed limit results from government regulations intended to protect the eyes of users.

The rotating beam provides for the definition of a plane, particular suitable for contracting, architectural, and surveying purposes. However, at large distances from the laser, the time during which the laser beam sweeps across the target area is very short. For example, a 2 inch (5 mm.) wide target that is 100 feet (30 m.) away from the instrument would be illuminated by the laser beam only about 270 micro-seconds at 60 rev./min. This is less than the integration time of the human retina, and thus causes the beam to appear dimmer to the user.

The projected beam is almost always Gaussian or near Gaussian, which means that the edges of the beam are not clearly defined. Furthermore, as the target is moved farther from the source, the beam spreads and becomes more degraded. Thus, using an "edge" introduces error. If a user tries very carefully to determine the center of the beam, difficulty still arises due to the lack of contrast.

Thus, there is a need for inexpensive passive target devices which can function in ambient light, give good visibility of the target's viewing device to the user with accurate indexing, which is small and portable so the target can be stored in a tool kit or pocket of a shirt or jacket, and which is sturdy yet relatively inexpensive, so as to endure rough handling and be easily replaceable.

SUMMARY OF THE INVENTION

The present invention is an improvement on the method and apparatus described in the above-identified copending application. This invention also makes use of the fact that the human eye and optical/nervous system is extremely good at splitting a distance in half or finding the center of a circle, etc., and at perceiving differences in brightness. Targets according to the present invention are relatively inexpensive passive devices of minimum size, e.g. 3 inches by 5 inches by ½ inch thick, or even thinner, which can fit in a shirt pocket or the like.

These unique targets are constructed with their elements incorporated as target structure, rather than as optical elements housed in a case. For example the lens and beam divider functions can be formed of optical quality parts such as a polycarbonate or acrylic generally rectangular block-like body, on one end of which is formed (or mounted) adjacent parts of fresnel lenses which provide a lens means which is the optical equivalent of the input lens and beam dividing axicon. The viewing screen diffuser function is provided by a frosted area or a hologram at the other end of the block. To improve and maintain alignment, these parts are assembled into an essentially integral element. The optical path for the impinging light beam (after it is divided) transmitted and, in some embodiments reflected, from the input lenses to the view window through the block body, which functions as a light guide as well as forming the basic structural member of the target.

The divided image beam is transmitted through the light guide, which functions as a wave guide, to a filter and a frosted surface (or equivalent hologram) at the viewing window. The sides and edges (except for the input and output or viewing areas) of the block-like body are preferably covered with suitable light blocking label material. Such material can be chose to have filter capabilities as well; this is useful in an embodiment wherein the viewing area is on a side, rather than the opposite end, of the body.

Utilizing integral constructions as disclosed, and using easily available fresnel lenses, frosted polycarbonate pieces, and the aforementioned label materials, offers advantages of minimized expense space for the optical elements, and built-in permanent alignment of these elements. The results are target constructions which are sturdy, passive in operation, have no external protuberances, are relatively small and convenient, and will withstand rough handling in a construction environment.

DESCRIPTION OF THE PREFERRED EMBODIMENT

According to the basic arrangement of the invention, an input scanning light beam 10 is received at an input aperture or window, and is divided into two preferably equal parts. The basic method and apparatus are disclosed and claimed in the copending U.S. patent application Ser. No. 08/520,853.

Figure 1:
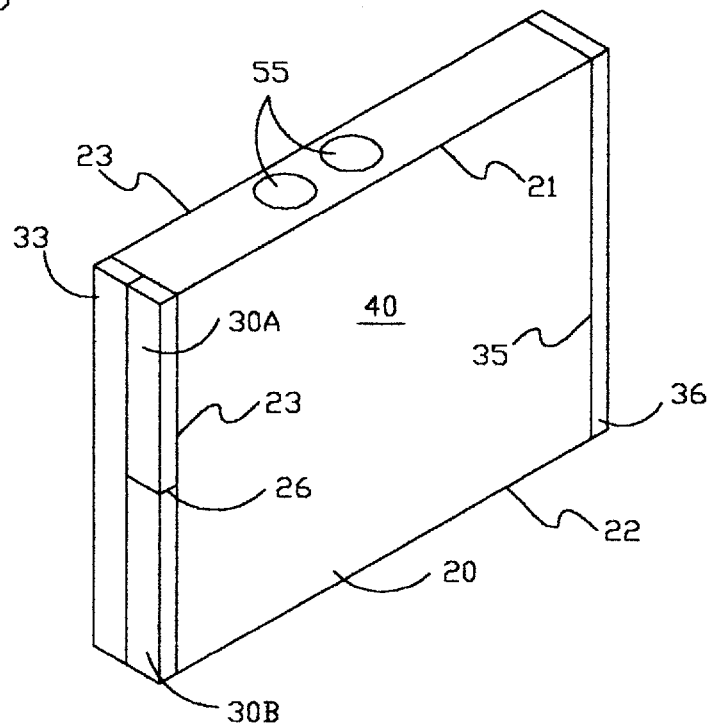
FIG. 1 is an exploded perspective view of one form of a target device according to the invention, with the lens and beam splitting parts at the input end of the body block, and the viewing screen at the opposite end of the block.

The embodiment illustrated in FIG. 1 is a suitably formed relatively thin (no greater than 0.50 inch) plate or block 20 of optical quality polycarbonate or acrylic. One end 23 of the block has attached to it a pair of complementary fresnel lenses 30A, 30B.

These lenses may be prepared from a commercially available acrylic or cellulose acetate butyrate molded fresnel lens which has its center section removed, leaving upper lens 30A and lower lens 30B, the resulting ends of which are abutted. The lenses are then secured together as shown providing a lens means which functions to produce from the incoming scanning beam 10 two beams 32A, 32B, that are focused onto the viewing window provided by a frosted plate 36, which may be of polycarbonate or equivalent, at the other end 35 of the body block, in the same manner as the beam splitting axicon disclosed in the aforementioned patent application Ser. No. 08/520,853. A filter material may be added to this end of the block to enhance the contrast and visibility of the images. Plate 36 may also be made from suitably colored material to function further as a filter. A third fresnel lens 33 is preferably mounted alongside lenses 30A, 30B. Lens 33 functions to provide a focused reference beam at the viewing window, as described hereafter.

Figure 3:
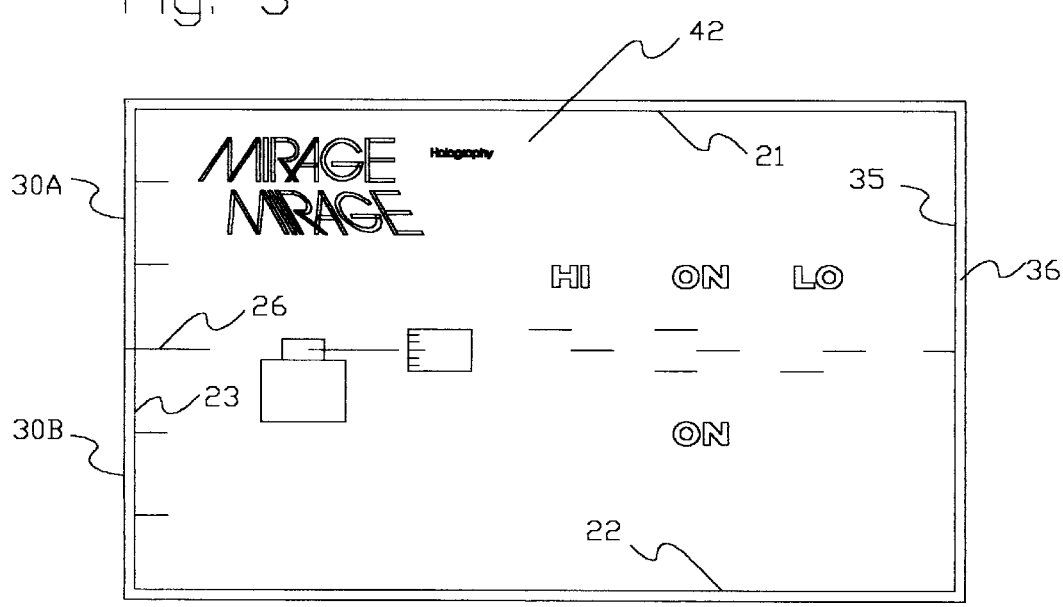
FIG. 3 is a side view of the target shown in FIG. 1.

The block 20 functions as a wave guide or light guide and minimizes scattering of the beams and provides for total internal reflection of the light to exit at the viewing window. To enhance this property, the front face 40 of block 20 is covered with a label 42 (FIG. 3) which also provides a convenient space for manufacturer's identification, and a schematic diagram of the function and use of the target, as shown. Similar label pieces preferably are applied to the upper and lower edges 21, 22 and back side 23 of block 20. The lenses 30A, 30B and the viewing plate 36 thus are the only uncovered surfaces of block 20 in this embodiment.

It should be understood that the body block is not required to be a solid member to function as the requisite waveguide. An equivalent structure is a hollow block formed with internally reflective front and back surfaces, and fitted with the input lens means (as described above) and a viewing screen.

Figure 4:
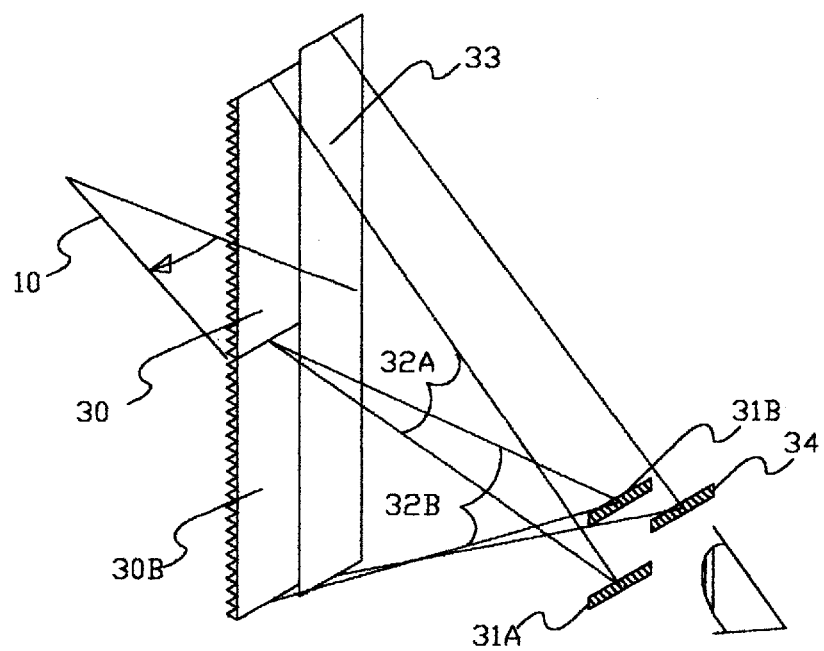
FIG. 4 is a view illustrating the light beam paths through the block body and the images observed by a user.
Figure 2:
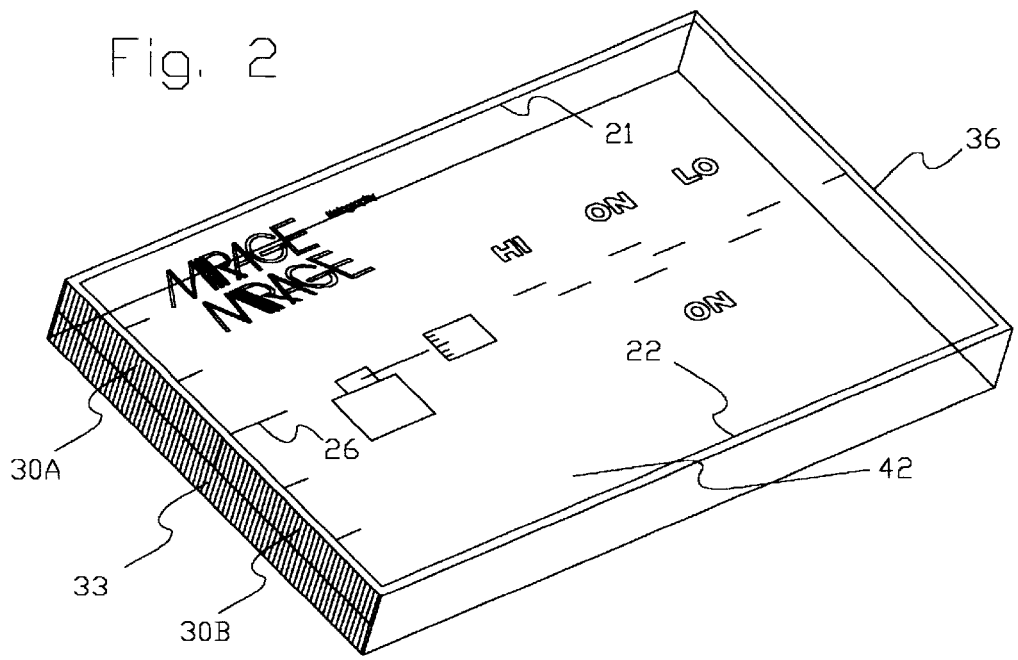
FIG. 2 is a perspective view, on another angle, of the target shown in FIG. 1.

Referring to FIG. 4, the beam from upper lens 30A produces a line image 31A and the beam from lens 30B produces a second image 31B, these two images being spaced above and below the reference image 34 produced by lens 33, will be equal in brightness and apparent width when the incoming scanning beam 10 is centered on the lenses at the index marks 26. If the target is above or below the level of the scanning beam, one or the other of images 31A, 31B will be unequal in brightness and apparent width with respect to each other, and will also appear different in brightness with respect to the reference mark. Thus, the user simply moves the target up or down until equal brightness and apparent width of the images is seen, then uses the mark or marks 26 as a guide to make a notation as appropriate.

Figure 5:
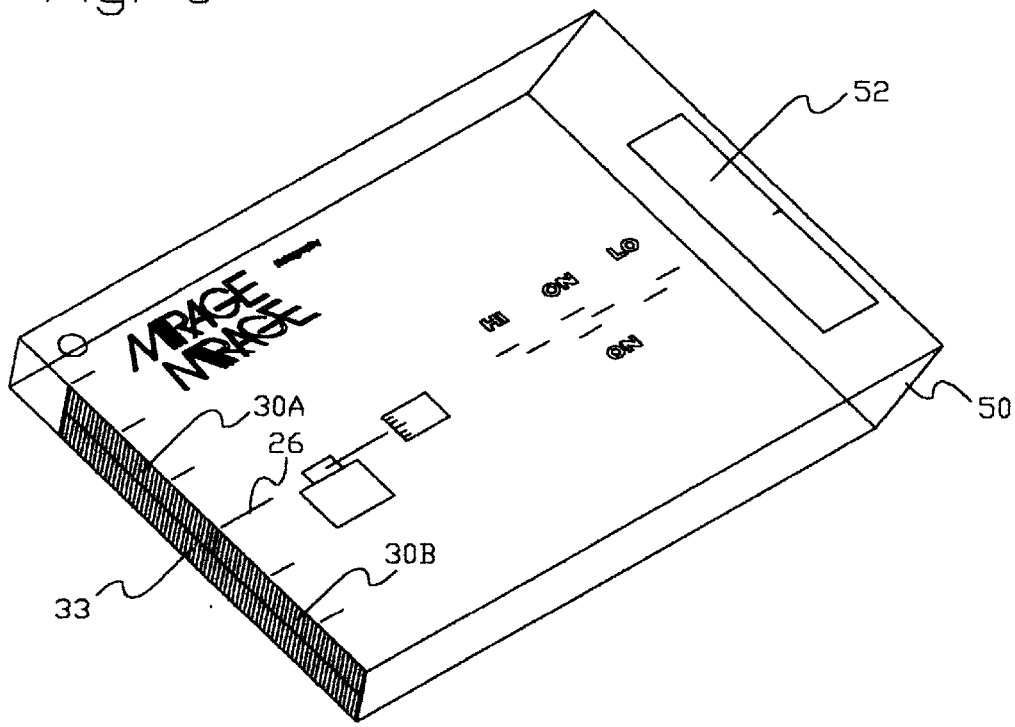
FIG. 5 is a perspective view of another form of a target device according to the invention, in which the optical path is diverted in the body block to a viewing screen at a window in a side of the body.
Figure 6:
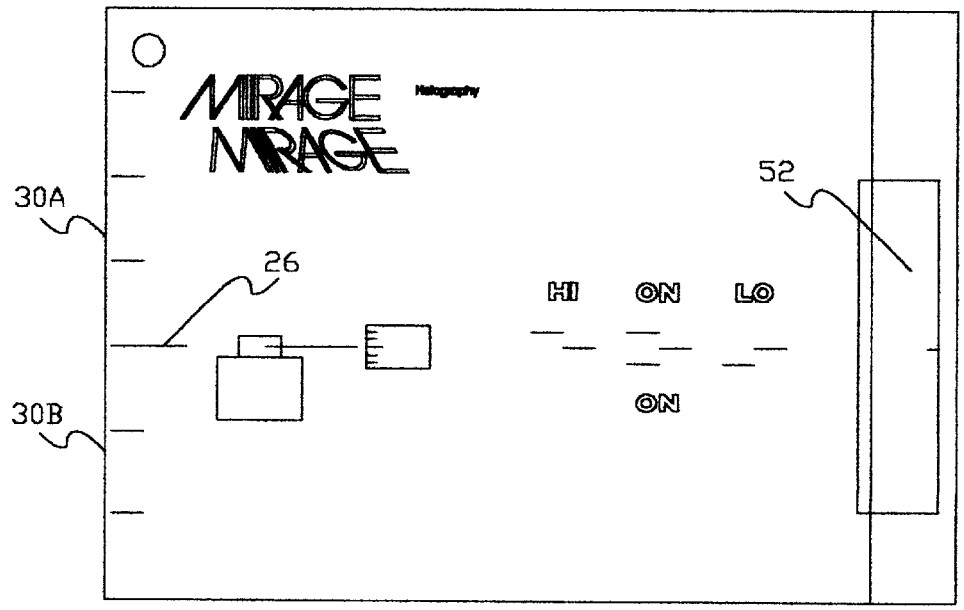
FIG. 6 is a side view of the embodiment shown in FIG. 5.

Referring to FIGS. 4 and 5, if it is desired to have the viewing area or screen at the side face of the target, block 20 can be provided with a 450 bevel surface 50, which can function as an internal reflecting surface to direct the to a viewing screen 52 defined by an opening in the front face label. In all other respects the arrangement of parts on block 20 is the same.

A particularly important advantage of this light target is that it allows for readily finding the centerline of a scanning light beam in normal room lighting; various filters can be added to provide adequate ambient light rejection, as may be necessary. The target is also tolerant of changes in the tilt angle of the target with respect to the centerline of the incoming scanning beam. If the reference mark 34 on the target housing is coincident with the centerline or beam axis, then that mark, and the correct determination of the centerline, will be independent of rotation about that reference mark. The central ray through lens 33, where the reference image 34 appears on the viewing screen, will be an indicator of the centerline of the scanning beam, even though the body may be tilted about reference mark 26.

The forms of target disclosed in this application are relatively inexpensive, sturdy, passive hand held devices which can be dimensioned to fit within a shirt pocket, and are able to function with great accuracy and under considerable variation in ambient lighting. For purposes of supporting the target from, for example ferrous materials such as metallic rails used to support ceiling tiles, the target body is provided with a pair of high strength permanent magnets 55 recessed into the upper edge 21.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a scanning system for providing marks at a surface located at a distance from a scanning light beam source, the improvement comprising a target body located at the surface, said target body including a generally rectangular optical block having relatively wide front and back surfaces and relatively narrower opposed first and second ends and opposed upper and lower edges, a lens means on said first end of said block for receiving a light beam from the scanning source and for dividing the light beam impinging on said target into at least two beam parts directed through said block to said second end, diffuser means providing a viewing screen associated with said second end of said block, said lens means forming an input window on said target and said block functioning as a waveguide to transmit the divided light beams from said lens means to said viewing screen to produce adjacent images visible on said viewing screen for comparison as to visual equality and/or alignment, and said lens means including first and second fresnel lenses mounted to said first end of said block in vertical alignment and each receiving and scanning beam forming separate images on said viewing screen.

2. A target as defined in claim 1, further including a reference indicator on said target body located at a predetermined position with respect to said inlet window, whereby said target can be located on the surface and adjusted with respect to the scanning light beam until the images from the divided beams appear equal, and the reference indicator can be used to mark the surface.

3. A target as defined in claim 1, further including a third fresnel lens alongside said first and second lenses for receiving the scanning beam and forming a reference image on said viewing screen.

4. A target as defined in claim 1, further including a reflector surface formed on said block at said second end to direct light beams to said front surface of said block, said viewing window being located on said front surface of said block.

5. A passive hand held target for locating the center of a scanning light beam impinged repeatedly on said target, said target comprising a target body having front and back surfaces and first and second opposed end walls and including a pair of focusing and beam dividing fresnel lenses on said first end wall for receiving the scanning light beam impinging on said target and dividing the input beam into at least two beam parts, diffuser means on said second end wall providing a viewing screen, a third fresnel lens alongside said first and second lenses for receiving the scanning beam and forming a reference image on said viewing screen, said body providing wave guide means for directing the divided parts of the light beam onto said viewing screen adjacent said reference image to produce visible adjacent images on said viewing screen for comparison as to visual equality.

6. A target as defined in claim 5, wherein said target body is an optical block onto which said focusing/beam dividing and reference lenses are mounted at said first end.

7. A target as defined in claim 6, further including a reference indicator on said target body, whereby said body can be located at the surface and adjusted with respect to the scanning light beam until the images from the divided beams appear equal, and the reference indicator can then be used to mark the surface.

8. A target as defined in claim 6, wherein the functions of said focusing and beam dividing are provided by first and second fresnel lenses which are formed from a master fresnel lens by removing its center section to leave separate upper and lower complementary fresnel lenses which, when assembled their ends abutted at the removed center section, produce separate beams from an incoming scanning beam.

9. A target as defined in claim 6, wherein said body is an optical block onto which said lenses are mounted, said block functioning as a waveguide to transmit the divided light beams from said lens means to said second viewing screen.

10. A target as defined in claim 5, further including a reflector surface formed on said block at said second end to direct light beams to said front surface of said block, said viewing window being located on said front surface of said block.

\* \* \* \* \*